United States Patent
Allen et al.

(10) Patent No.: US 7,408,734 B2
(45) Date of Patent: Aug. 5, 2008

(54) PREVENTING DAMAGE TO THE HEADS AND MEDIA IN A REMOVABLE CARTRIDGE AND DISK DRIVE

(75) Inventors: Gregory M. Allen, Layton, UT (US); Jeffery D. Penman, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 82 days.

(21) Appl. No.: 11/478,370

(22) Filed: Jun. 29, 2006

(65) Prior Publication Data

US 2008/0002274 A1 Jan. 3, 2008

(51) Int. Cl.
*G11B 21/02* (2006.01)
*G11B 21/22* (2006.01)

(52) U.S. Cl. ........................ 360/75; 360/256
(58) Field of Classification Search .............. 360/256, 360/256.6
See application file for complete search history.

(56) References Cited

U.S. PATENT DOCUMENTS

| | | | | |
|---|---|---|---|---|
| 6,016,240 A | * | 1/2000 | Jargon et al. ........... | 360/255.5 |
| 6,876,510 B2 | * | 4/2005 | Heydt et al. ........... | 360/75 |
| 6,958,880 B2 | * | 10/2005 | Lee et al. .............. | 360/75 |
| 2005/0105205 A1 | * | 5/2005 | Suzuki .................. | 360/75 |
| 2005/0128633 A1 | * | 6/2005 | Hosokawa ............. | 360/75 |
| 2005/0201000 A1 | * | 9/2005 | Koh et al. .............. | 360/75 |
| 2007/0121252 A1 | * | 5/2007 | Hong et al. ............ | 360/254 |

* cited by examiner

*Primary Examiner*—Jason C Olson
(74) *Attorney, Agent, or Firm*—Stephen C. Beuerle; Procopio Cory Hargreaves & Savitch LLP

(57) ABSTRACT

A disk drive uses the integration of the instantaneous velocities of the heads to estimate the distance the heads travel while latched. The disk drive can then determine if the heads are properly parked based solely on the distance traveled, thus avoiding the use of costly sensors. In the event that the heads cannot be properly parked due to some malfunction, the disk drive may store a special code in a nonvolatile memory. The special code directs the controller not to spin up or attempt to load the heads on any disk, preventing the disk from being damaged by the heads.

15 Claims, 3 Drawing Sheets

PREVENTING DAMAGE TO THE HEADS AND MEDIA IN A REMOVABLE CARTRIDGE AND DISK DRIVE

TECHNICAL FIELD

This invention relates to computer storage products, and more particularly to preventing damage to the heads and media in a removable cartridge and disk drive.

BACKGROUND

A disk drive is a data storage device that stores data in concentric tracks on a disk. Data is written to or read from the disk by spinning the disk about a central axis while positioning a transducer contained on read/write heads near a target track of the disk. During a read operation, data is transferred from the target track to an attached host through the transducer. During a write operation, data is transferred in the opposite direction.

For a number of years, it has been a common practice to build hard disk drives with a head parking arrangement, where the magnetic head is moved to a parked position when it is not in use. In the parked position, the head is aligned with a radially inner or radially outer edge portion of the hard disk, beyond the region of the disk where information is stored. The parked position keeps the heads safe from mechanical shock and vibration. The heads cannot be on the media unless it is spinning, or else they may become stuck there, and damage to the heads or media may occur.

In the case of a removable disk drive, the heads must also be kept in a safe place during disk insertion and removal, or else they may be damaged by moving parts, such as shutters and doors. Currently, additional sensors may added to a disk drive to determine if the heads are properly parked. However, adding sensors or other parts to a disk drive is undesirable as additional parts increase the overall cost and complexity of the drive.

What is needed is a disk drive that can determine if the heads of the drive are properly parked without adding costly sensors or parts to the drive. Preferably the drive would use a system that takes advantage of parts already needed on the drive for other functions.

SUMMARY

A disk drive uses the integration of the instantaneous velocities of the heads to estimate the distance the heads travel while latched. The disk drive can then determine if the heads are properly parked based solely on the distance traveled, thus avoiding the use of costly sensors. In the event that the heads cannot be properly parked due to some malfunction, the disk drive may store a special code in a nonvolatile memory. The special code directs the controller not to spin up or attempt to load the heads on any disk, preventing the disk from being damaged by the heads.

DESCRIPTION OF DRAWINGS

These and other features and advantages of the invention will become more apparent upon reading the following detailed description and upon reference to the accompanying drawings.

DETAILED DESCRIPTION

Figure 1:
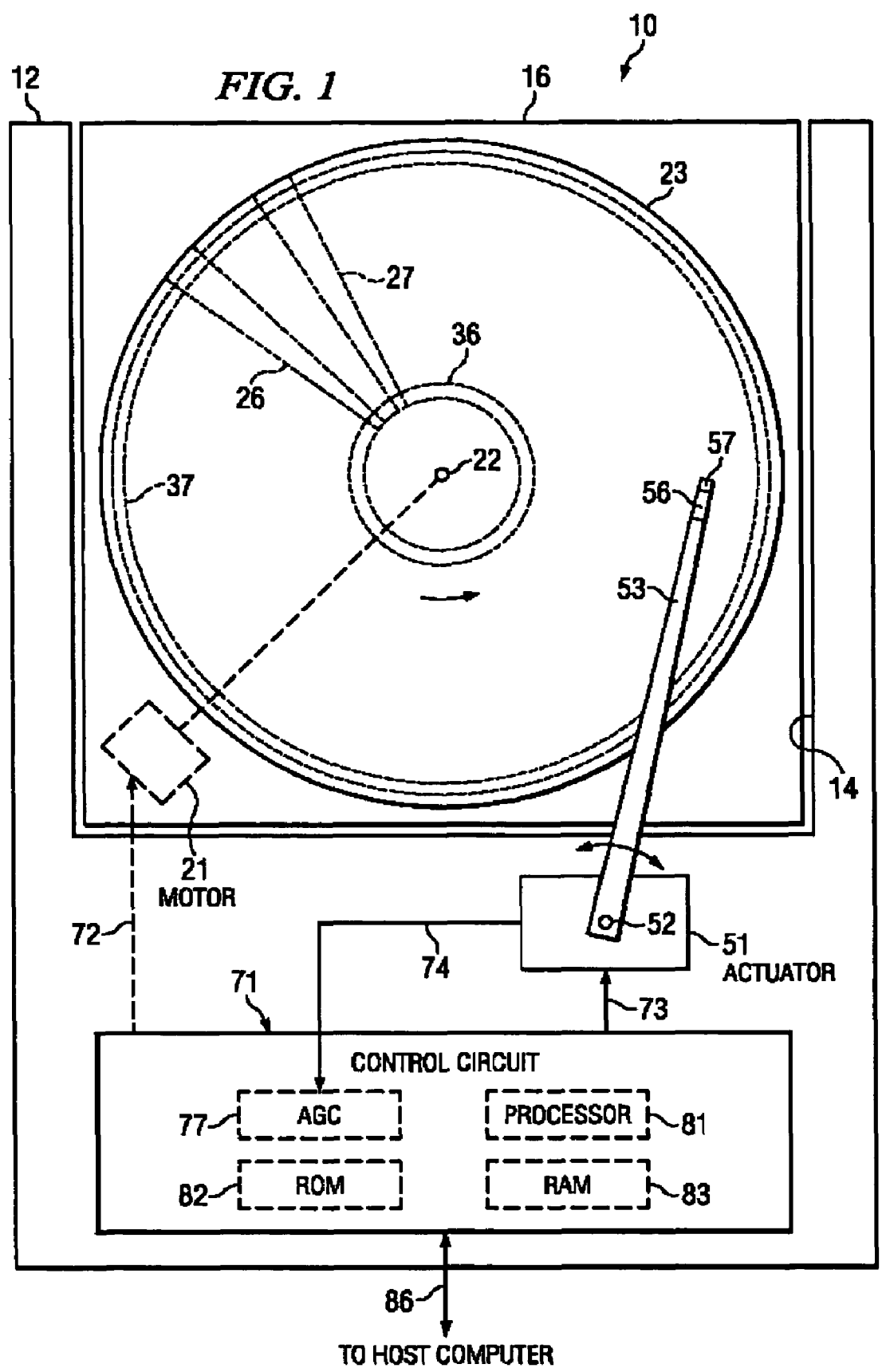
FIG. 1 is a diagrammatic view of an apparatus which is an information storage system that embodies aspects of the present invention.

FIG. 1 is a diagrammatic view of an apparatus which is an information storage system 10, and which embodies aspects of the present invention. The system 10 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is fixedly mounted on the shaft 22 for rotation therewith. The side of the disk 23 which is visible in FIG. 1 is coated with a magnetic material of a known type, and serves as an information storage medium. This disk surface is conceptually divided into a plurality of concentric data tracks. In the disclosed embodiment, there are about 50,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 73,000 servo tracks. The servo tracks effectively define the positions of the data tracks, in a manner known in the art.

Data tracks are arranged in a concentric manner ranging from the radially innermost tracks 36 to the radially outermost tracks 37. User data is stored in the many data tracks that are disposed from the innermost tracks 36 to the outermost tracks 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In the disclosed embodiment, the head 57 is a component of a known type, which is commonly referred to as a giant magneto-resistive (GMR) head. However, it could alternatively be some other type of head, such as a magneto-resistive (MR) head.

During normal operation, the head 57 is disposed adjacent the magnetic surface on the disk 23, and pivotal movement of the arm 53 causes the head 57 to move approximately radially with respect to the disk 23, within a range which includes the innermost tracks 36 and the outermost tracks 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. As stated above, the distance the head floats above the disk is known as the "fly-height."

The drive 12 includes a control circuit 71, which is operationally coupled to the motor 21 in the cartridge 16, as shown diagrammatically at 72. The control circuit 71 selectively supplies power to the motor 21 and, when the motor 21 is receiving power, the motor 21 effects rotation of the disk 23. The control circuit 71 also provides control signals at 73 to the actuator 51, in order to control the pivotal position of the arm 53. At 74, the control circuit 71 receives an output signal from the head 57, which is commonly known as a channel signal. When the disk 23 is rotating, segments of servo information and data will alternately move past the head 57, and the channel signal at 74 will thus include alternating segments or bursts of servo information and data.

The control circuit 71 includes a channel circuit of a known type, which processes the channel signal received at 74. The channel circuit includes an automatic gain control (AGC) circuit, which is shown at 77. The AGC circuit 77 effect variation, in a known manner, of a gain factor that influences the amplitude of the channel signal 74. In particular, the AGC circuit uses a higher gain factor when the amplitude of the channel signal 74 is low, and uses a lower gain factor when the amplitude of the channel signal 74 is high. Consequently, the amplitude of the channel signal has less variation at the output of the AGC circuit 77 than at the input thereof.

The control circuit 71 also includes a processor 81 of a known type, as well as a read only memory (ROM) 82 and a random access memory (RAM) 83. The ROM 82 stores a program which is executed by the processor 81, and also stores data that does not change. The processor 81 uses the RAM 83 to store data or other information that changes dynamically during program execution.

The control circuit 71 of the drive 12 is coupled through a host interface 86 to a not-illustrated host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In the disclosed embodiment, the host interface 86 conforms to an industry standard protocol which is commonly known as the Universal Serial Bus (USB) protocol, but could alternatively conform to any other suitable protocol, including but not limited to the IEEE 1394 protocol.

Figure 2:
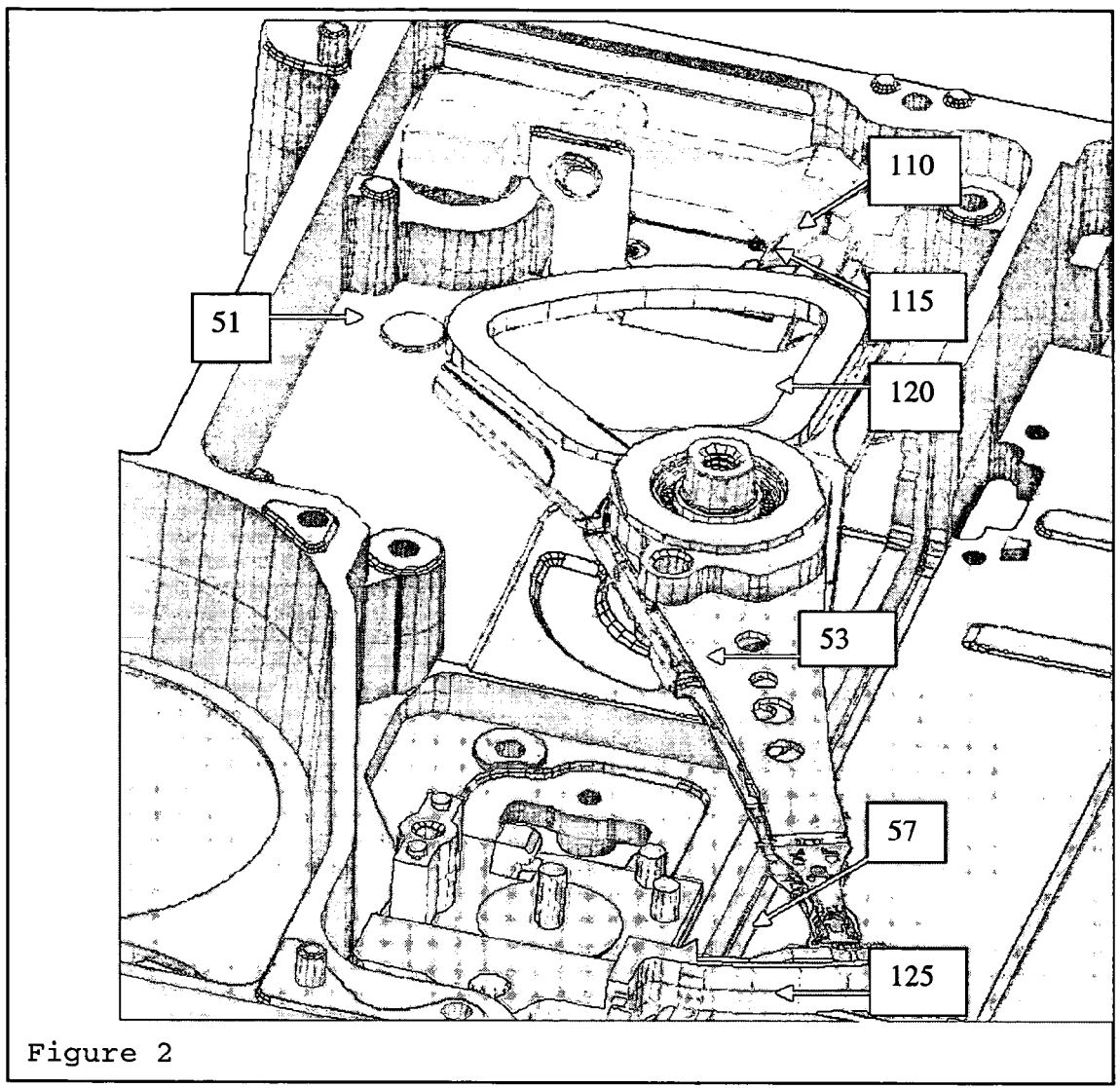
FIG. 2 illustrates in further detail portions of the information storage system of FIG. 1.

FIG. 2 illustrates in further detail portions of the drive 12 including the actuator 51, arm 53, and heads 57. When the heads 57 are parked in a safe location, a tang 115 on the fantail 120 of the actuator arm 53 falls between two stops in a latch 110. When the actuator arm 53 is latched, the heads 57 are prevented from moving outside the safe park location in the event the drive is dropped. The tang 115 in the fantail 120 of the actuator is 53 can still move between the stops in the latch 110, but the travel distance is limited.

Disk drives typically use the Back Electromotive Force (BEMF) of the Voice Coil Motor (VCM) to provide feedback to control the velocity of the heads 57 as they are loaded onto and from the disk media 23. The control circuit 71 controls the current through the VCM and measures the BEMF of the moving VCM. The control circuit 71 can be used to implement a digital velocity control loop to precisely control the load and unload velocity of the heads 57.

Figure 3:
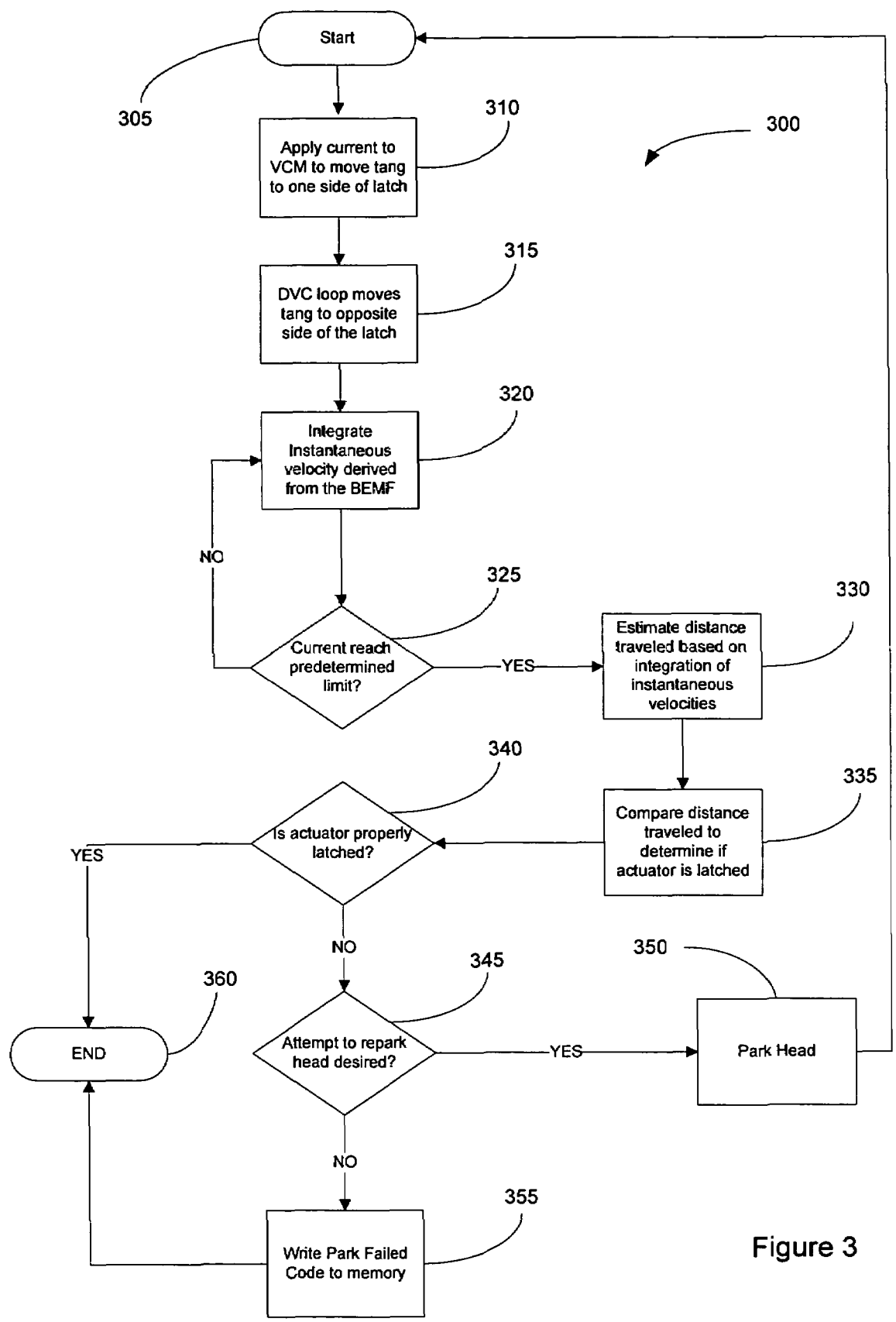
FIG. 3 is a flowchart illustrating a process for determining if the heads are properly parked in a disk drive.

FIG. 3 illustrates a process 300 in which the control circuit 71 in the disk drive 12 determines if the actuator is latched (and therefore the heads are safe). The process begins in a START block 305. Proceeding to block 310, a current is applied to the VCM to move the tang 115 on the fantail 120 of the actuator against one side of the latch 110. This ensures the actuator arm 53 engages one of the latch 110 stops, thus maximizing the area within which the actuator arm 53 may move.

Proceeding to block 315, the process 300 uses the digital velocity control loop to move the tang 115 toward the other side of the latch 110. This allows the actuator arm 53 to begin movement away from the first stop of the latch 110. The process 300 then proceeds to block 320, where the digital control loop detects and integrates (sums) the instantaneous velocity derived from the BEMF. The control loop tries to keep the actuator arm 53 moving at a constant velocity by regulating the current to the VCM. The actuator arm 53 stops when the tang 115 reaches the other side of the latch 110, and the controller naturally ramps up the current to maintain velocity.

Proceeding to block 325, the control circuit 71 determines when the current reaches a preset limit, thus indicating that the tang 115 has reached the other side of the latch 110. If the current has not reached the preset limit, the process 300 proceeds along the NO branch back to block 320, where the integration of the instantaneous velocities continues. Once the current reaches the preset limit, the process 300 proceeds along the YES branch to block 330. In block 330, the instantaneous velocities derived from the BEMF are used to make an estimate of the distance traveled.

Proceeding to block 335, the process 300 compares the estimate of the distance traveled between the two sides of the latch with preset limits to determine if the actuator has moved too little to be latched, is properly latched, or has moved too far to be latched. The preset limits can be programmed into the control circuit 71 upon drive build or calibration.

Proceeding to block 340, the control circuit 71 now determines if the actuator is properly latched. If the actuator is properly latched, then the heads 57 are parked and the process 300 may terminate in END block 360. However, if the actuator is not properly latched, the process 300 proceeds along the NO branch to block 345. In block 345, it is determined whether another attempt should be made at reparking the head. Additional attempts to park the head could either be time-consuming, or audibly noisy, and therefore may not always be desired. The control circuit 71 could, for example, attempt a preset number of retries before abandoning an effort to park the head. If it is determined it is desirable to repark the head, the process proceeds to block 350 where another attempt is made to park the heads using known techniques. The process 300 would then repeat from the START block 305 to determine if the head parking was successful it would be good if we did not have to attempt them, except when necessary. Thus, having a low-cost, reliable method of testing that the heads are parked allows for the quickest, quietest park method, while maintaining confidence that the heads will be safe.

Returning to block 345, if it is decided that a maximum number of attempts to park the heads has been made, the process 300 proceeds to block 355. In block 355, the control circuit 71 determines that the heads cannot be properly parked, perhaps due to some mechanical or electrical failure. This is particularly important in a disk drive with removable media. If the heads cannot be parked properly, they could become damaged. The damaged heads in turn could damage other disk cartridges subsequently inserted into the drive. Thus, when the control circuit 71 determines that the actuator is not properly latched, the control circuit writes a special code to a nonvolatile memory such as the RAM 83. The special code indicates that the park failed, and that the heads may be damaged. Every time the drive is powered up, the control circuit 71 checks for the presence of the special code. If the special code is present, the control circuit 71 goes into a mode that prevents the spindle motor from spinning and prevents the heads from loading onto the disk. Thus, although the drive becomes inoperable, it is prevented from causing further damage to any disks which may contain valuable data. After writing the park failure code to memory, the process 300 terminates at END block 360.

Numerous variations and modifications of the invention will become readily apparent to those skilled in the art. Accordingly, the invention may be embodied in other specific forms without departing from its spirit or essential characteristics.

What is claimed is:

1. A method for determining if the head of a disk drive is parked comprising:
    placing an actuator containing the heads in a first position, wherein the first position corresponds to a first stop of a latch operable to constrain the actuator for parking;
    moving the actuator from the first position to a second position while recording the instantaneous velocities of the actuator, wherein the second position corresponds to a second stop of the latch;
    estimating a distance traveled between the first position and the second position by integrating the instantaneous velocities; and
    comparing the distance traveled to a predetermined distance to determine that the head is parked.

2. The method of claim 1, further comprising deriving the instantaneous velocity using Back Electromotive Force of a voice coil motor.

3. The method of claim 1, further comprising comparing the current of a voice coil motor to a predetermined limit to indicate the actuator has reached the second position.

4. The method of claim 1, further comprising determining whether the heads should be reparked when the distance traveled indicates the head is not parked.

5. The method of claim 4, further comprising reparking the head if it is determined the heads should be reparked.

6. The method of claim 4, further comprising writing a park failed code into a memory of the disk drive if it is determined the heads should not be reparked.

7. The method of claim 6, further comprising preventing the heads from loading on the disk if the park failed code is present in memory.

8. A disk drive system comprising:
    an actuator containing read/write heads;
    a latch having a first stop and a second stop, the latch operable to constrain the actuator for parking;
    a disk containing storage media;
    a voice coil motor which moves the actuator; and
    a control circuit which controls the voice coil motor, wherein the control circuit places the actuator in a first position corresponding to the first stop and then moves the actuator to a second position corresponding to the second stop while integrating the instantaneous velocities of the actuator to estimate a distance traveled between the first position and the second position, the control circuit comparing the distance traveled to a predetermined distance to determine that the head is parked.

9. The disk drive system of claim 8, wherein the disk containing the storage media is contained in a removable cartridge.

10. The disk drive system of claim 8, the instantaneous velocity is obtained using Back Electromotive Force of a voice coil motor.

11. The disk drive system of claim 8, wherein a current of the voice coil motor is compared to a predetermined limit to indicate the actuator has reached the second position.

12. The disk drive system of claim 8, wherein the control circuit determines whether the heads should be reparked when the distance traveled indicates the head is not parked.

13. The disk drive system of claim 12, wherein the control circuit reparks the heads if it is determined the heads should be reparked.

14. The disk drive system of claim 12, wherein a park failed code is written into a memory of the disk drive if it is determined the heads should not be reparked.

15. The disk drive system of claim 14, wherein the control circuit prevents the heads from loading on the disk if the park failed code is present in memory.

* * * * *